United States Patent
Formica et al.

(10) Patent No.: US 12,503,976 B2
(45) Date of Patent: *Dec. 23, 2025

(54) ARCHITECTURE OF A TURBOMACHINE WITH COUNTER-ROTATING TURBINE

(71) Applicant: SAFRAN AIRCRAFT ENGINES, Paris (FR)

(72) Inventors: Olivier Formica, Moissy-Cramayel (FR); Romain Truco, Moissy-Cramayel (FR); Paul Ghislain Albert Levisse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/001,418

(22) PCT Filed: Jun. 1, 2021

(86) PCT No.: PCT/FR2021/050986
§ 371 (c)(1),
(2) Date: Dec. 9, 2022

(87) PCT Pub. No.: WO2021/250336
PCT Pub. Date: Dec. 16, 2021

(65) Prior Publication Data
US 2023/0203985 A1  Jun. 29, 2023

(30) Foreign Application Priority Data
Jun. 10, 2020  (FR) ........................... 2006063

(51) Int. Cl.
| *F02C 3/067* | (2006.01) |
| *F01D 1/24* | (2006.01) |
| *F01D 25/16* | (2006.01) |
| *F02C 7/06* | (2006.01) |
| *F02K 3/072* | (2006.01) |

(52) U.S. Cl.
CPC ............. *F02C 3/067* (2013.01); *F01D 1/24* (2013.01); *F01D 25/162* (2013.01); *F02C 7/06* (2013.01); *F02K 3/072* (2013.01); *F05D 2250/44* (2013.01)

(58) Field of Classification Search
CPC .......... F02C 3/067; F01D 25/162; F01D 1/24; F05D 2250/44
See application file for complete search history.

(56) References Cited

U.S. PATENT DOCUMENTS

| 10,669,893 | B2 * | 6/2020 | Stuart | ................. F01D 25/22 |
| 2004/0055276 | A1 * | 3/2004 | John Lewis | ............ F02C 3/067 60/226.1 |

(Continued)

FOREIGN PATENT DOCUMENTS

| EP | 1655475 A1 | 5/2006 |
| WO | 2020221548 A1 | 11/2020 |

OTHER PUBLICATIONS

French Search Report issued in French Application No. FR 2006063 on Jan. 26, 2021 (2 pages).

(Continued)

*Primary Examiner* — Devon C Kramer
*Assistant Examiner* — Robert Toshiharu Igue
(74) *Attorney, Agent, or Firm* — Bookoff McAndrews, PLLC

(57) ABSTRACT

Counter-rotating turbine of a turbomachine extending about an axis of rotation and comprising an inner rotor having at least one inner moving blade supported in rotation by a first shaft, an outer rotor rotating in an opposite direction to the inner rotor, and comprising at least one outer moving blade supported in rotation by a second shaft coaxial with the first shaft, the first and second shafts extending axially from upstream to downstream of the turbine, the first shaft being guided in rotation by a first bearing disposed between the (Continued)

first shaft and an upstream casing of the turbine, and the second shaft being guided in rotation by a second bearing disposed between the second shaft and said upstream casing of the turbine, the first bearing and the second bearing being disposed upstream of a first stage of the inner rotor.

7 Claims, 3 Drawing Sheets

(56) References Cited

U.S. PATENT DOCUMENTS

| | | | |
|---|---|---|---|
| 2006/0093464 A1 | 5/2006 | Moniz et al. | |
| 2006/0093465 A1* | 5/2006 | Moniz | F02C 3/067 415/68 |
| 2006/0093467 A1* | 5/2006 | Orlando | F02C 3/067 415/68 |
| 2006/0272314 A1* | 12/2006 | Moniz | F01D 5/141 60/39.162 |
| 2010/0205934 A1 | 8/2010 | Gallet | |
| 2017/0342839 A1* | 11/2017 | Miller | F01D 5/141 |
| 2018/0258858 A1* | 9/2018 | Moniz | F02C 3/067 |

OTHER PUBLICATIONS

International Search Report issued in International Application No. PCT/FR2021/050986 filed on Sep. 7, 2021, with English Translation (4 pages).

\* cited by examiner

[Fig. 2]
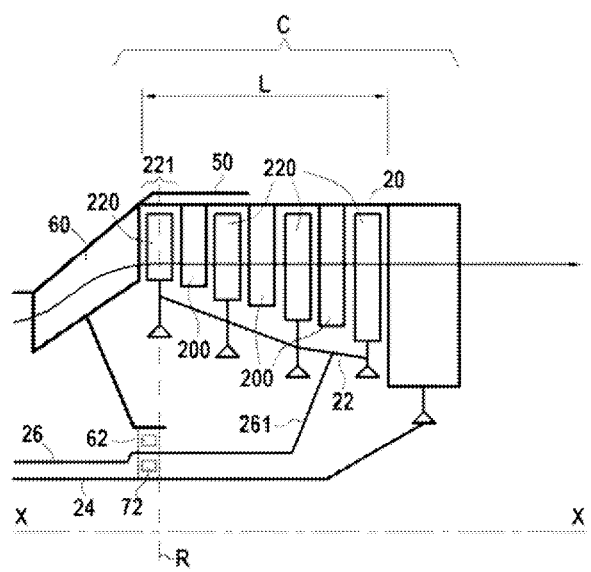

[Fig. 3A]
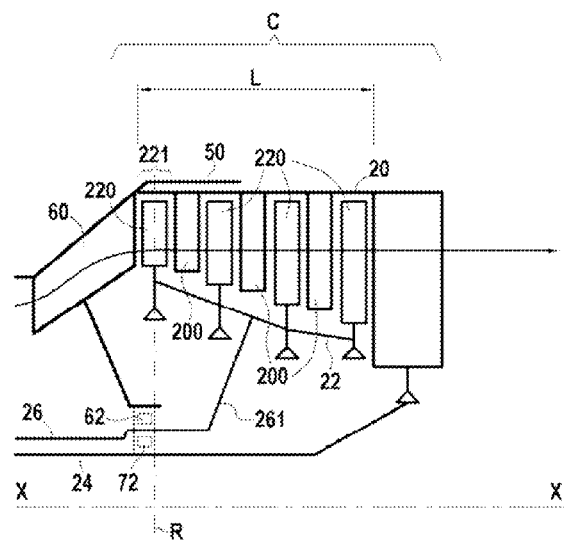
[Fig. 3B]
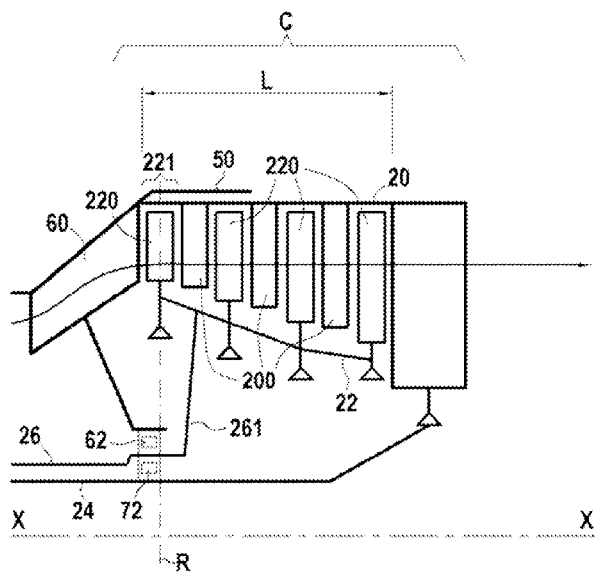

ARCHITECTURE OF A TURBOMACHINE WITH COUNTER-ROTATING TURBINE

CROSS-REFERENCE TO RELATED APPLICATION(S)

This patent application is a continuation of and claims the benefit of priority to International Application No. PCT/FR2021/050986, filed on Jun. 1, 2021, now published as WO 2021/250336 A1, which claims priority to French Application No. FR 2006063, filed on Jun. 10, 2020, the entirety of which is incorporated herein by reference.

TECHNICAL FIELD

The present disclosure relates to the field of turbomachines. More specifically, the present disclosure relates to a counter-rotating turbine of a turbomachine, and a turbomachine comprising such a turbine.

PRIOR ART

An aircraft turbomachine generally comprises, from upstream to downstream in the direction of gas flow, a fan, a low-pressure compressor, a high-pressure compressor, a combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

In order to improve the efficiency of the engine, the aircraft turbomachines can be equipped with a counter-rotating turbine, instead of the low-pressure turbine. The counter-rotating turbine comprises an inner rotor, called fast rotor, connected to a first turbine shaft, and configured to rotate in a first direction of rotation, and an outer rotor, called slow rotor, connected to a second turbine shaft, and configured to rotate in a second direction of rotation, opposite to the first direction of rotation. The blades of the first rotor are interposed with the blades of the second rotor.

In known manner, the first turbine shaft is in particular centered and guided by a bearing mounted between the first shaft and an upstream turbine casing (or TVF for "turbine vane frame" casing), disposed upstream of the counter-rotating turbine, and the second turbine shaft is centered and guided by another bearing mounted between the second shaft and a downstream turbine casing (or TRF for "turbine rear frame" casing), disposed downstream of the counter-rotating turbine.

Nevertheless, this architecture has some drawbacks. In particular, the position of the bearing guiding the second shaft causes the latter to be very long, and is therefore subjected to significant bending forces. However, significant bending of the second shaft relative to the first shaft can lead to the appearance of clearances between the rotors, or the modification of already existing clearances. Particularly, the first bending mode of the first and second shafts can be in the operating range, which can pose a problem in terms of mechanical dimensioning of the shafts, and create significant clearance consumptions between the two rotors, impacting the performances, or even generate inter-shaft contacts in case of a too significant response on this mode.

Furthermore, the bearings of the first and second shafts being carried by different structures (upstream casing for the first shaft and downstream casing for the second shaft), the local deformations of these casings, caused by expansions or distortions, generate different displacements of these shafts, and therefore the appearance of clearances between different portions of the rotors. For example, relative displacements between the first and the second rotor can lead to the appearance of a clearance between the blades of the first rotor and the abradable track of the second rotor. Such clearances, caused by differential deformations of the rotors, can lead to leaks which are detrimental to the performance of the turbomachine.

In addition, the known architectures of these counter-rotating turbines involve outer rotor containment in an external casing, and therefore high temperatures in the latter. Indeed, the presence of such an external casing is necessary to carry both the upstream casing and the downstream casing of the turbine, and thus ensure the structural link between the upstream casing and the downstream casing. The fact that this outer rotor is contained in an external casing limits the possibility of installing a cooling device for this rotor, or of installing measuring means for the blades, such as endoscopes.

There is therefore a need for a counter-rotating turbine architecture that allows at least partially overcoming the drawbacks above.

DISCLOSURE OF THE INVENTION

The present disclosure relates to a counter-rotating turbine of a turbomachine extending about an axis of rotation and comprising:
  an inner rotor configured to rotate about the axis of rotation, and comprising at least one inner moving blade rotatably supported by a first shaft,
  an outer rotor configured to rotate about the axis of rotation in an opposite direction to the inner rotor, and comprising at least one outer moving blade rotatably supported by a second shaft coaxial with the first shaft, the first and second shafts extending axially from upstream to downstream of the turbine, in which the first shaft is guided in rotation by a first bearing disposed between the first shaft and an upstream casing of the turbine, and the second shaft is guided in rotation by a second bearing disposed between the second shaft and said upstream casing of the turbine, the first bearing and the second bearing being disposed upstream of a first stage of the inner rotor.

In the present disclosure, the terms "inner" and "outer", and the terms "internal" and "external" and their derivatives are considered according to the radial direction of the turbine. Likewise, the terms "upstream" and "downstream" are considered according to the normal direction of gas flow in the turbomachine, along the axis of rotation.

The first and the second shaft can be tubular, and are coaxial, by extending along the axis of rotation. By "disposed between the first shaft and an upstream casing of the turbine", it is meant that the first bearing, and therefore the first shaft, are carried by the upstream casing of the turbine, an outer end, or outer ring, of the first bearing being fixed to the upstream casing of the turbine, an inner end, or inner ring, of the first bearing being fixed to the first shaft.

By "disposed between the second shaft and said upstream casing of the turbine", it is meant that the second bearing, and therefore the second shaft, are carried, possibly indirectly, by the upstream casing of the turbine. In other words, the forces exerted by the second shaft, for example the bending forces, are transmitted to the upstream casing of the turbine, without the outer end, or outer ring of the second bearing necessarily being in direct contact with the upstream casing of the turbine. By "possibly indirectly", it is meant that another element can be interposed between the upstream casing of the turbine and the second bearing, this element possibly being for example the first shaft and the first bearing. Furthermore, the inner end, or inner ring of the second bearing is fixed to the second shaft.

Thus, the first and second bearings are both ultimately carried by the same casing that is to say by the upstream casing of the turbine. Consequently, the deformations, due for example to an expansion of the upstream casing of the turbine during the operation of the turbine, are transmitted to each of the two bearings jointly so that these will move simultaneously. The absence of differential displacement of one casing relative to another casing thus limits the risk of appearance or modifications of clearances between different portions of the rotors, caused for example by relative displacements between the first and the second rotor. The limitation of these clearances caused by differential deformations of the rotors thus allows limiting the risk of appearance of leaks, and improving the efficiency and performances of the turbomachine.

In addition, the bearings being both carried by the upstream casing of the turbine, the downstream casing generally present on the turbines according to the state of the art, is no longer necessary to carry the second bearing, and can therefore be deleted. This allows minimizing the mass of the turbine.

Furthermore, by "first stage of the inner rotor" it is meant the stage of the inner rotor disposed most upstream of said rotor, according to the axis of rotation. It is therefore meant that the fact of disposing the first bearing and the second bearing upstream of the first stage of the inner rotor means that no blade of the inner rotor is located upstream of these bearings. The fact of disposing the first and second bearings upstream of the inner rotor, and therefore also upstream of the outer rotor, allows reducing the center distance of the second shaft, without increasing the center distance of the first shaft. By "center distance" it is meant the distance between the upstream bearing, guiding the shaft upstream of the turbomachine, and the downstream bearing, that is to say the first or the second bearing, guiding the shaft downstream of the turbomachine, at the level of the counter-rotating turbine.

Indeed, it would also be possible to reduce the length of the second shaft by disposing the two bearings at the level of a median plane of the turbine, which would also allow limiting the gyroscopic effects and the appearance of differential clearances between the two rotors. However, this solution would require lengthening the center distance of the first shaft. This would cause a reduction in the frequency of the first bending mode of this first shaft, and therefore an increase in the bending moments as well as a risk of significant clearance consumptions between the two rotors, or even inter-shaft contacts in case of a too important response in this mode.

According to the present disclosure, the first and second bearings being located upstream of the inner rotor, it is possible to increase the frequency of the first bending mode of the second shaft, minimizing the bending moments in this shaft, without increasing those of the first shaft. The risks of inter-shaft contacts and the dynamic clearance consumptions between the two rotors are thus limited.

Furthermore, this solution allows facilitating the recovery of oil in the engine. Indeed, the fact of disposing the two bearings at the level of a median plane of the turbine would have the drawback of generating very low oil recovery angles, given the shift of the bearings downstream. It would then be necessary to add parts to allow the recovery of the oil. The solution proposed in the present disclosure allows purifying the lubrication and the behavior of the enclosure. Indeed, the bearings being disposed upstream of the turbine, and therefore axially close to the upstream casing of the turbine, it is possible to obtain greater recovery angles, and thus facilitate the recovery of the oil.

In some embodiments, the at least one inner moving blade is rotatably supported by a portion of the first shaft cantilevered relative to the first bearing, and the at least one outer moving blade is rotatably supported by a portion of the second shaft cantilevered relative to the second bearing.

By "cantilevered" it is meant that the inner blades are carried by the first shaft at a position located downstream of the first bearing, and the outer blades are carried by the second shaft at a position located downstream of the second bearing. In other words, given the fact that the two bearings are carried by the upstream casing of the turbine, the support of the inner and outer rotors by the first and the second shaft is performed downstream of the two bearings, according to the axis of rotation.

In some embodiments, the second bearing is disposed between the second shaft and the first shaft.

In other words, an outer end of the second bearing is fixed to the first shaft, and an inner end of the first bearing is fixed to the first shaft. In other words, the first and the second bearing are disposed and fixed on either side of the wall of the first shaft, and are both carried by the upstream casing of the turbine.

In some embodiments, the first and second bearings are disposed substantially in line with each other along the axis of rotation.

In other words, the first and second bearings are disposed substantially on the same radial plane normal to the axis of rotation. Thus, deformation forces originating from the upstream casing of the turbine are more effectively transmitted from the first bearing to the second bearing, the path of the forces being minimized. Consequently, a displacement, for example a bending, of the first shaft will generate a substantially identical displacement of the second shaft. The risks of differential displacements between the inner rotor and the outer rotor are thus further limited.

In some embodiments, the first and second bearings are disposed substantially in line with the upstream casing of the turbine along the axis of rotation.

In other words, the first and second bearings are disposed substantially on the same radial plane normal to the axis of rotation, as the upstream casing of the turbine. It is thus possible to increase the oil recovery angles, and further facilitate oil recovery.

In some embodiments, the first and second bearings are disposed upstream of the upstream casing of the turbine.

This configuration has the advantage of shifting the downstream bearings that is to say the first and second bearings, further upstream, thus reducing the center distances, and thus further limiting the bending moments.

In some embodiments, the at least one inner moving blade is rotatably supported by the first shaft, by means of a disk disposed substantially at the level of a median plane of the turbine.

In some embodiments, the at least one inner moving blade is rotatably supported by the first shaft, by means of a disk disposed further upstream than said median plane, according to the axis of rotation.

The median plane, or geometric center, designates the center, along the axis of rotation, of the total length of the turbine. The disk, or trunnion, ensures the mechanical connection between the first shaft and the disks of the inner rotor. The fact of shifting this disk upstream of the turbine allows reducing the length of the portion of the first shaft downstream of the first bearing, and therefore reducing the cantilever relative to the first bearing. This allows reducing the dynamic clearance consumptions between the inner and outer rotors, and thus improving the performances of the turbine.

In some embodiments, the turbine comprises an outer casing at least partially surrounding the outer rotor, the outer casing extending axially from an upstream end of the turbine, up to a position disposed upstream of a downstream end of the turbine.

In some embodiments, the outer casing extends axially from the upstream end of the turbine over a length of less than 50%, preferably less than 30%, more preferably less than 15% of the length of the turbine.

Given the fact that the first and second bearings are both carried by the upstream casing of the turbine, the downstream casing generally present on the turbines according to the state of the art, is no longer necessary to carry the second bearing, and can therefore be deleted. Moreover, it is no longer necessary either to have an outer casing to carry the downstream casing and surrounding the outer rotor over the entire length of the latter. Thus, the downstream portion of the outer rotor is no longer contained. Consequently, a cooling device can be disposed in order to directly cool this downstream portion, and measuring devices such as endoscopes can be more easily set up. It is also possible to house sealing devices, such as labyrinth seals or segmented radial seals, between the rotor and the stator, thereby limiting the leaks in the turbine.

In some embodiments, the first and second bearings are ball bearings.

In some embodiments, the first and second bearings are roller bearings. The roller bearings allow counteracting the differential expansions more effectively.

The present disclosure also relates to a turbomachine comprising the turbine according to any one of the preceding embodiments.

BRIEF DESCRIPTION OF THE DRAWINGS

The invention and its advantages will be better understood upon reading the detailed description given below of different embodiments of the invention given by way of non-limiting examples. This description refers to the pages of appended figures, on which:

FIG. 2 represents a schematic view of a low-pressure turbine according to the present disclosure, FIGS. 3A and 3B represent modified examples of the low-pressure turbine of FIG. 2.

DESCRIPTION OF THE EMBODIMENTS

Figure 1:
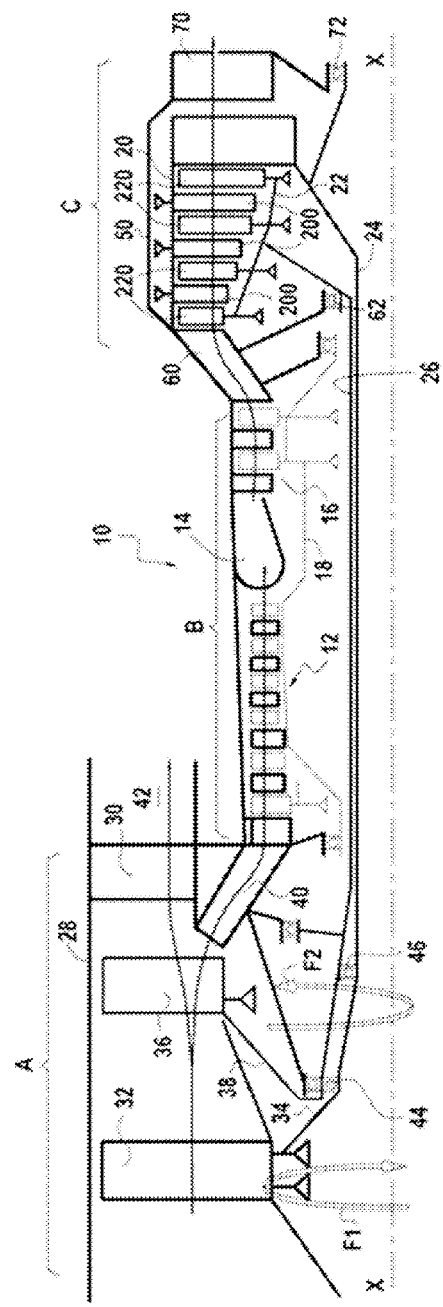
FIG. 1 represents a general view illustrating the principle of operation of a turbomachine with counter-rotating fans according to the state of the art.

Referring to FIG. 1, a turbomachine 10 with counter-rotating fans includes a longitudinal axis X-X. From upstream to downstream according to the direction of gas flow in the turbomachine (represented by the black arrow), the turbomachine 10 essentially comprises three parts: an upstream module A (or fan section), an intermediate module B (or high-pressure body) and a downstream module C (or low-pressure turbine section).

The three parts A, B and C of the turbomachine are modular that is to say they each form a single assembly and can each be replaced by being separated from the other parts of the turbomachine.

In a manner well known per se, the high-pressure body B comprises a gas generator to produce combustion gases. This gas generator comprises a compressor 12, a combustion chamber 14 and a high-pressure turbine 16.

The air compressed by the compressor 12 is mixed with the fuel in the combustion chamber 14 before being combusted. The combustion gases thus produced drive the moving blades of the high-pressure turbine 16 which itself drives the compressor 12 via a high-pressure shaft 18. The circulation of the combustion gases in the turbomachine 10 takes place axially from upstream to downstream.

The low-pressure turbine section C comprises a first annular rotor, or outer rotor 20. This outer rotor 20 comprises a row of outer turbine moving blades 200 which extend radially inward and which are axially spaced from each other.

The low-pressure turbine section C also comprises a second annular rotor, or inner rotor 22. This inner rotor 22 comprises a row of inner turbine moving blades 220 which extend radially outward and which are axially spaced from each other. The turbine blades 200, 220 of the inner and outer rotors 20, 22 are disposed alternately relative to each other such that the inner and outer rotors 20, 22 are nested into each other.

The turbine moving blades 200 of the outer rotor 20 are rotatably supported by a first low-pressure shaft 24. Similarly, the turbine moving blades 220 of the inner rotor 22 are rotatably supported by a second low-pressure shaft 26 coaxially disposed about the first shaft 24. The low-pressure shafts 24, 26 extend axially from upstream to downstream of the axis X of the turbomachine. The inner and outer rotors 20, 22 are surrounded by an outer casing 50.

The low-pressure turbine section C is traversed by the combustion gases coming from the high-pressure body B. These combustion gases therefore drive in rotation the turbine blades 200, 220 of the inner and outer rotors 20, 22 in opposite directions. Thus, the first and second low-pressure shafts 24, 26 also rotate in a counter-rotating manner.

The fan section A is located upstream of the turbomachine 10. A cowl 28 annularly surrounds this fan section A. The cowl 28 is supported by spacers 30 which extend radially inwardly of the turbomachine.

The fan section A includes a first row of fan blades 32 mounted on an upstream fan shaft 34 which is connected to an upstream end of the first low-pressure shaft 24.

The fan section A also includes a second row of fan blades 36 which are spaced axially downstream of the first row of fan blades 32 and mounted on a rear fan shaft 38 connected to an upstream end of the second low-pressure shaft 26.

The first and second rows of fan blades 32, 36 thus rotate in opposite directions which are represented, by way of example, by the respective arrows F1 and F2. This counter-rotating fan configuration thus gives the turbomachine high efficiency for relatively low specific consumption.

The fan blades 32, 36 extend radially from the upstream 34 and downstream 38 fan shafts practically up to the cowl 28. They are disposed in the air circulation passage supplying both the primary flowpath 40 leading to the compressor 12 of the high-pressure body B and the secondary bypass flowpath 42.

At the level of its upstream end, the first low-pressure shaft 24 supports in rotation the second low-pressure shaft 26 via a first rolling bearing 44 and a second rolling bearing 46 disposed downstream of the first rolling bearing.

The first rolling bearing 44 is of the ball bearing type to withstand the axial loads, while the second rolling bearing 46 is of the roller bearing type to withstand the radial loads of the turbomachine.

At the level of its downstream end, the first low-pressure shaft 24 is centered and guided by a bearing 72 mounted between the first shaft 24 and a downstream turbine casing 70 (or TRF casing, or exhaust casing). Furthermore, at the level of its downstream end, the second low-pressure shaft 26 is centered and guided by a bearing 62 mounted between the second shaft 26 and an upstream turbine casing 60 (or TVF casing, or inter-turbine casing). The bearings 62 and 72 can be roller bearings or ball bearings.

The rest of the description describes, with reference to FIGS. 2, 3A and 3B, an arrangement of the bearings of the counter-rotating turbine of the present disclosure, in particular of the low-pressure turbine C of the turbomachine 10. Nevertheless, this embodiment is not limited to this low-pressure turbine, and can be adapted to other elements of the turbomachine, for example the high-pressure turbine.

According to this embodiment, the bearing 72 of the second low-pressure shaft 26 is moved axially upstream, along the axis of rotation X, relative to its position described with reference to FIG. 1. More specifically, the bearing 62 is always mounted between the second shaft 26 and the upstream casing 60 of the turbine, at the same axial position. However, according to this configuration, the bearing 72 is mounted between the first shaft 24 and the upstream turbine casing 60 as well. In other words, the bearings 62 and 72 are both carried by the same upstream turbine casing 60.

Particularly, the bearing 72 is disposed between the first shaft 24 and the second shaft 26. The bearing 72 is therefore an inter-shaft bearing, in which its outer end is fixed to the second shaft 26 rotating in one direction, and its inner end is fixed to the first shaft 24 rotating in an opposite direction to the first shaft 24.

In addition, the bearings 62 and 72 can be disposed in line with each other, that is to say be substantially aligned with each other according to a radial direction. In other words, they can be disposed substantially at the same axial position, along the axis X.

The two bearings 62 and 72 are disposed upstream of the first stage 221 of the inner rotor 22. More specifically, the bearings 62 and 72 are disposed upstream of a radial plane R normal to the axis of rotation X, and comprising the blades 220 of the first stage 221 of the inner rotor 22.

According to this configuration, the first shaft 24 is shorter than according to the configuration presented with reference to FIG. 1. Thus, the bending forces to which the first shaft 24 is subjected are minimized.

The bearings 62 and 72 being both carried by the upstream turbine casing 60, the downstream casing 70 is no longer necessary to carry the bearing 72, and can consequently be eliminated, in order to minimize the mass of the turbine C. Similarly, unlike the turbine described with reference to FIG. 1, the outer casing 50 extends axially only over a portion of less than 50%, preferably less than 30%, even more preferably less than 15% of the length L of the turbine. Thus, the downstream portion of the outer rotor 20 is no longer confined by the outer casing 50. The temperatures reached by the outer rotor 20 will therefore be lower than in a configuration in which it is entirely surrounded by the outer casing 50, limiting thus the risk of breakdowns. Furthermore, a cooling device (not represented) can be more easily set up in order to directly cool this downstream portion. In addition, this configuration makes the outer rotor more accessible. It is thus possible to inspect it more easily, using an endoscope for example, without having to dismount the motor.

In addition, according to the embodiment illustrated in FIG. 2, the disk 261 that allows ensuring the mechanical connection between the second shaft 26 and the disks of the inner rotor 22 is disposed on a downstream portion of the inner rotor 22. This example is however not limiting, other configurations being possible.

FIGS. 3A and 3B illustrate modified examples of this embodiment. In the example of FIG. 3A, the disk 261 is disposed at the level of a geometric center of the turbine C. More specifically, when the turbine C extends axially over a length L between the blade located most upstream along the axis X, and the blade located most downstream, the disk 261 is disposed at a distance substantially equal to L/2 from the blade 220 of the first stage 221 located most upstream, along the axis X that is to say the blade of the first stage 221.

In the example of FIG. 3B, the disk 261 is disposed on an upstream portion of the inner rotor 22, that is to say between the radial plane R and the geometric center of the turbine C. This allows reducing the dynamic clearance consumptions between the inner and outer rotors, and thus improving the performances of the turbine.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Accordingly, the description and drawings should be considered in an illustrative rather than restrictive sense.

The invention claimed is:

1. A turbomachine with counter-rotating fans extending about an axis of rotation and comprising a fan section which includes a first row of fan blades which is connected to an upstream end of a first low-pressure shaft, and a second row of fan blades spaced axially downstream of the first row of fan blades and which is connected to an upstream end of a second low-pressure shaft disposed radially outwardly of the first low-pressure shaft, the first row of fan blades and the second row of fan blades rotating in opposite directions, the turbomachine further comprising a counter-rotating turbine driving the first and second rows of fan blades, the counter-rotating turbine of the turbomachine comprising:

an inner rotor configured to rotate about the axis of rotation, and comprising at least one inner moving blade rotatably supported by the second low-pressure shaft; and an outer rotor configured to rotate about the axis of rotation in an opposite direction to the inner rotor, and comprising at least one outer moving blade rotatably supported only at a downstream end of the outer rotor by the first low-pressure shaft coaxial with the second low-pressure shaft, the first and second low-pressure shafts extending axially from upstream to downstream of the turbine, wherein the second low-pressure shaft is guided in rotation by a first bearing disposed between the second low-pressure shaft and an upstream casing of the turbine, and the first low-pressure shaft is guided in rotation by a second bearing disposed between the second low-pressure shaft and the first low-pressure shaft, the first bearing and the second bearing being disposed on a same radial plane normal to the axis of rotation, upstream of a first stage of the inner rotor, wherein the turbomachine further comprising an outer casing extending axially from the upstream end of the outer rotor over a length of not more than 50% of a length of the outer rotor.

2. The turbomachine according to claim 1, wherein the first and second bearings are disposed on a same radial plane, normal to the axis of rotation, as the upstream casing of the turbine along the axis of rotation.

3. The turbomachine according to claim 1, wherein the at least one inner moving blade is rotatably supported by the second low-pressure shaft, by means of a disk disposed at a level of a median plane of the turbine, or further upstream than said median plane, according to the axis of rotation.

4. The turbomachine according to claim 1, wherein the at least one inner moving blade is rotatably supported by a portion of the second low-pressure shaft cantilevered relative to the first bearing, and the at least one outer moving blade is rotatably supported by a portion of the first low-pressure shaft cantilevered relative to the second bearing.

5. The turbomachine according to claim 1, wherein the turbine does not include any turbine rear frame.

6. The turbomachine according to claim 1, wherein the first and second bearings are ball or roller bearings.

7. The turbomachine according to claim 1, wherein the first stage of the inner rotor and a first stage of the outer rotor are not directly coupled to any rotating shaft.

* * * * *